United States Patent
Soutome et al.

[11] Patent Number: 6,005,585
[45] Date of Patent: *Dec. 21, 1999

[54] METHOD OF PAINTING A PLURALITY OF REGIONS IN A LUMP

[75] Inventors: Hiroshi Soutome, Hitachi; Nobutoshi Yoshida, Kashiwa; Youichi Kawakami; Takeshi Yamamoto, both of Hitachi, all of Japan

[73] Assignees: Hitachi, Ltd., Tokyo, Japan; Hitachi Taga Engineering, Ltd., Hitachi, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/585,856

[22] Filed: Jan. 16, 1996

[30] Foreign Application Priority Data

Jan. 13, 1995 [JP] Japan ................................ 7-003770

[51] Int. Cl.$^6$ ........................................... G06T 11/00
[52] U.S. Cl. ............................................ 345/431
[58] Field of Search ................................ 395/131, 326, 395/333, 334, 339; 345/431, 440, 441, 326, 333, 334, 339

[56] References Cited

U.S. PATENT DOCUMENTS 5,611,028  3/1997  Shibasaki et al. ..................... 395/131
5,615,320  3/1997  Lavendez ............................. 395/131

OTHER PUBLICATIONS

Cowart "Mastering Windows 3.1" (1993) pp. 150–157.
Colin et al. "Debabelizer Reference Guide" (1993) pp. 216–217.

*Primary Examiner*—Almis R. Jankus
*Attorney, Agent, or Firm*—Kenyon & Kenyon

[57] ABSTRACT

A painting method for painting a plurality of regions with a plurality of colors by selecting and assigning respective colors corresponding to respective regions. The selection and assignment of colors is performed in a lump. Painting the plurality of regions with selected colors is also performed in a lump.

2 Claims, 3 Drawing Sheets

METHOD OF PAINTING A PLURALITY OF REGIONS IN A LUMP

BACKGROUND OF THE INVENTION

The present invention relates to a method of arranging colors to figures displayed on a display screen.

In a conventional display apparatus, when colors are arranged to a figure constructed by a plurality of areas, it is necessary to designate desired colors to the areas one by one.

For example, a case of arranging colors to a stack bar graph as shown in FIG. 1 is considered. It is assumed that red is designated to three areas 111, 112, and 113, blue is designated to three areas 121, 122, and 123, and green is designated to three areas 131, 132, and 133.

According to a conventional method, colors are arranged by designating and painting colors to the total nine areas one by one in a manner such that red is designated and painted to the area 111, red is similarly designated and painted to the area 112, red is similarly designated and painted to the area 113, blue is designated and painted to the area 121, and the like.

The number of color designations can be reduced by linking the areas to be painted the same color and regarding the linked areas as one area. Referring to FIG. 1, the three areas 111, 112, and 113 are regarded as one area and red is designated to the area, thereby enabling the three areas to be colored in a lump. By combining the areas as mentioned above, all of the nine areas can be colored by total three operations in the example of FIG. 1.

In such a conventional method, however, the color designating operations have to be still performed by the number corresponding to the number of areas to be colored.

There are cases of using colors just to make areas distinguished irrespective of color itself. For example, a graph formation is a typical example of such a case and a main purpose of arranging colors is to just distinguish elements by using colors. Particularly, when the number of component elements is large, the number of color designations is accordingly large, so that there is a problem such that it is troublesome to operate.

There is a method of arranging colors which intends to obtain a visual effect by regular variations in hue, for example, a case of expressing a gradation in the areas.

The gradation expression is such that density and lightness of color, ratio of color in a predetermined area, and the like are adjusted with certain regularity to gradually arrange colors, thereby obtaining the visual effect by the lightness/darkness of color and hue variations.

For example, the areas 131, 132, and 133 in FIG. 1 are set to red, the areas 121, 122, and 123 are set to red of which density is half of the color in the areas 131, 132, and 133 (it shows a state such that half of the number of dots per unit area is red dots and the other half is white dots) and the areas 111, 112, and 113 are set to red of which density is the half of the color in the areas 121, 122, and 123.

Even in such a case, according to the conventional method, it is necessary to designate colors by the number of areas in consideration of the regularity.

SUMMARY OF THE PRESENT INVENTION

An object of the present invention is to provide a method of arranging colors to a plurality of areas of a target figure by a lump operation in order to reduce troublesomeness in the conventional color designating operation as mentioned above.

According to the present invention, in an information processing apparatus having display means on which figures and the like are displayed, color samples are arranged and displayed on display means, a plurality of colors are selected in a lump from the color samples displayed, and the selected colors are painted in a plurality of areas encircled by segments.

According to the invention, the colors can be arranged to targets to be colored by the small number of operation steps irrespective of the number of areas.

PREFERRED EMBODIMENTS

Embodiments of the invention will be described hereinbelow with reference to the drawings.

Figure 2:
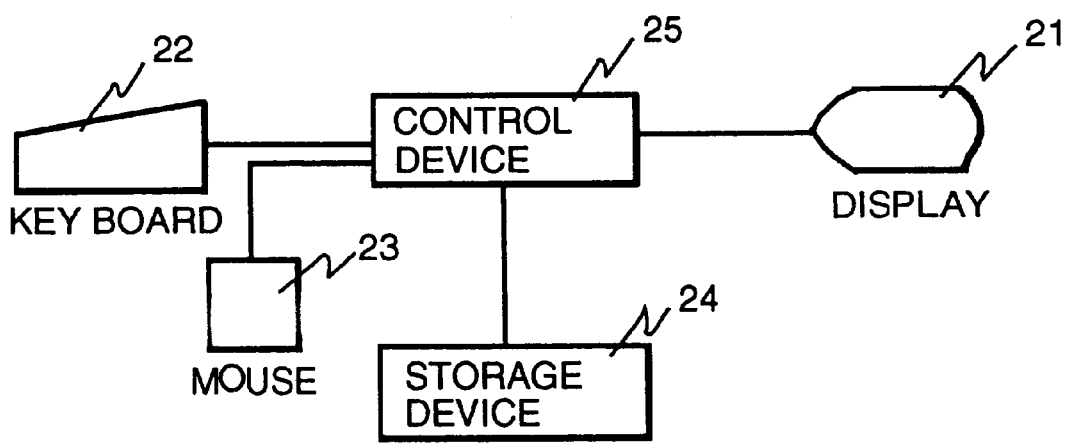
FIG. 2 is a diagram showing a construction of an information processing apparatus according to an embodiment of the invention.

An example of a construction of an information processing apparatus will now be described with reference to FIG. 2.

The construction example comprises: a display 21 for displaying figures, characters, and the like, a keyboard 22 for inputting characters and instructing functions, a mouse 23 for designating coordinates on the display 21, a storage device 24 for digitizing and storing programs in which control procedures are written and data such as figures, characters, and the like, and a control processing device 25 for controlling the above mentioned devices.

In accordance with the control procedures of the programs stored in the storage device 24, the control device 25 receives an instruction of the user through the keyboard 22 or mouse 23, executes the process according to the instruction of the user by storing or taking data to/from the storage device 24, and transmits the result to the user through the display 21.

An example of an identifier providing function will now be described.

The identifier providing function provides identifiers, for instance, identification (ID) numbers for the areas so that the areas to be colored can be respectively designated.

Referring again to FIG. 1, there are nine areas encircled by the line segments and it is requested to paint the same color to the areas 111, 112, and 1131, so that ID number 1 is given to the three areas. Similarly, ID number 2 is given to the areas 121, 122, and 123 and ID number 3 is given to the areas 131, 132, and 133.

Practically, when it is assumed that the segments constructing a graph have been drawn on the display 21, the user firstly requests the control device 25 to activate the identifier providing function. The control device 25 starts the procedure and requests the user to instruct areas of ID number 1. The user instructs an optional point included in the area 111 by the mouse 23 in FIG. 2 and the control device 25 stores the coordinates of the instructed point into the storage device 24. An optional point in the area 112 and that in the area 113 are designated and stored and, after that, the user sends the end of the area designating operation of ID number 1 to the control device 25.

The control device 25 requests the user to instruct areas of ID number 2, the user designates optional coordinates included in the areas in a manner similar to the case of ID number 1, and the control device 25 stores coordinates into the storage device 24.

When the ID numbers are given to all of the areas to be colored, the user requests the end of the ID number providing procedure to the control device 25, thereby finishing the ID number providing procedure.

As mentioned above, the coordinates to which the ID number is given are stored in the storage device 24 every ID number.

Although numbers are used as identifiers in the example, anything as long as which can designate areas, such as A, B, C, . . . , other marks, codes, or the like can be also used as identifiers.

Although optional coordinates in the area have been used as data indicative of the area in the example, others which can unconditionally show the area can be also used. For instance, in case of showing an internal area of a figure, a similar result can be also obtained by using parameters as data such as figure number, start and end points of figure, and the like which are attributions of the figure and by which the area can be discriminated from the other areas.

Figure 1:
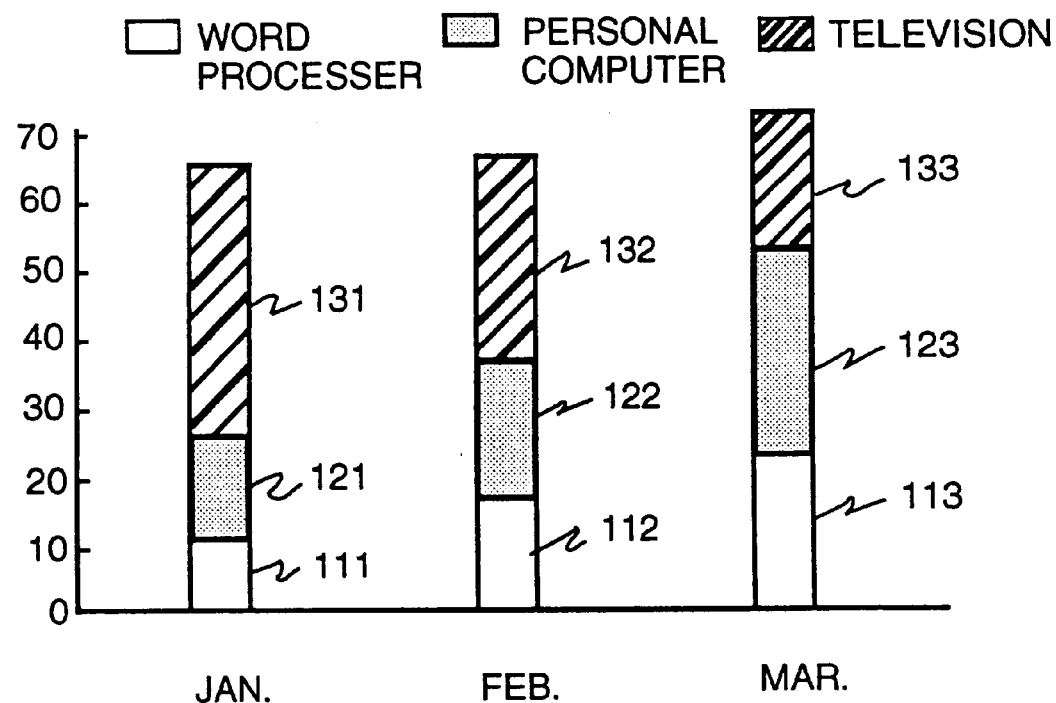
FIG. 1 is a diagram showing a stack bar graph as a target example of a color arrangement of the invention.

FIG. 1 shows the example of graph. In a general graph formation, numerical value data inputted is often automatically developed to a bar graph, a line graph, and the like on a screen.

In such a case, there is no need to give identifiers to the areas after the graph was displayed, but there can be provided means for automatically giving identifiers to elements included in one category (in the example, the areas 111, 112, and 113 are included in one category of "word processor") at a stage of numerical value data. By the time when the graph is formed, ID number 1 has already been given to the areas 111, 112, and 113 and ID number 2 has been given to the areas 121, 122, and 123.

In any case, it is sufficient that the ID numbers are already given to the areas at the color designation stage which will be described hereinlater.

A display example of the color samples and an example of method of selecting colors from the color samples will be described.

When colors are expressed on a display screen, various hues are expressed by combining three primary colors of the lights of red, green, and blue per unit and the lightness of each primary color is adjusted, thereby enabling more complicated neutral colors to be expressed.

An arrangement of various color samples expressed as mentioned above is called a palette here.

The shape of the palette and the arrangement of colors are basically arbitrary. It is also possible to prepare means for editing the palette in order to arrange the palette so as to be easily used by the user himself.

A palette in which a gradation is expressed and a method of selecting colors on the palette will be described with reference to FIG. 3. In the example, the color samples are arranged in a check pattern.

In the direction of an axis of abscissa of the palette, for example, colors in which the ratio of green dots is gradually increased are sequentially arranged on the color samples in which only red dots are used (it shows that the number of red dots per unit area is decreased and the number of green dots is increased). Redness is gradually vanished in the order of columns in the lateral direction from a pure red column to a column of yellow as a color between red and green, and to a column of pure green.

In a manner similar to the above, the ratio of blue is gradually increased from a column of green to a column of pure blue. When the column of pure blue is obtained, the ratio of red is increased. When columns are continued until just before the column of red, hues by RGB except white, black, and gray as a color between black and white can be thoroughly expressed.

In the direction of an axis of ordinate of the palette, lightness is gradually adjusted in the same hue and colors are arranged, for example, so that colors become dark in accordance with the order from the upper.

Consequently, a palette in which the gradation of hue is expressed in the lateral direction and the gradation of lightness is expressed in the vertical direction can be obtained.

Figure 6:
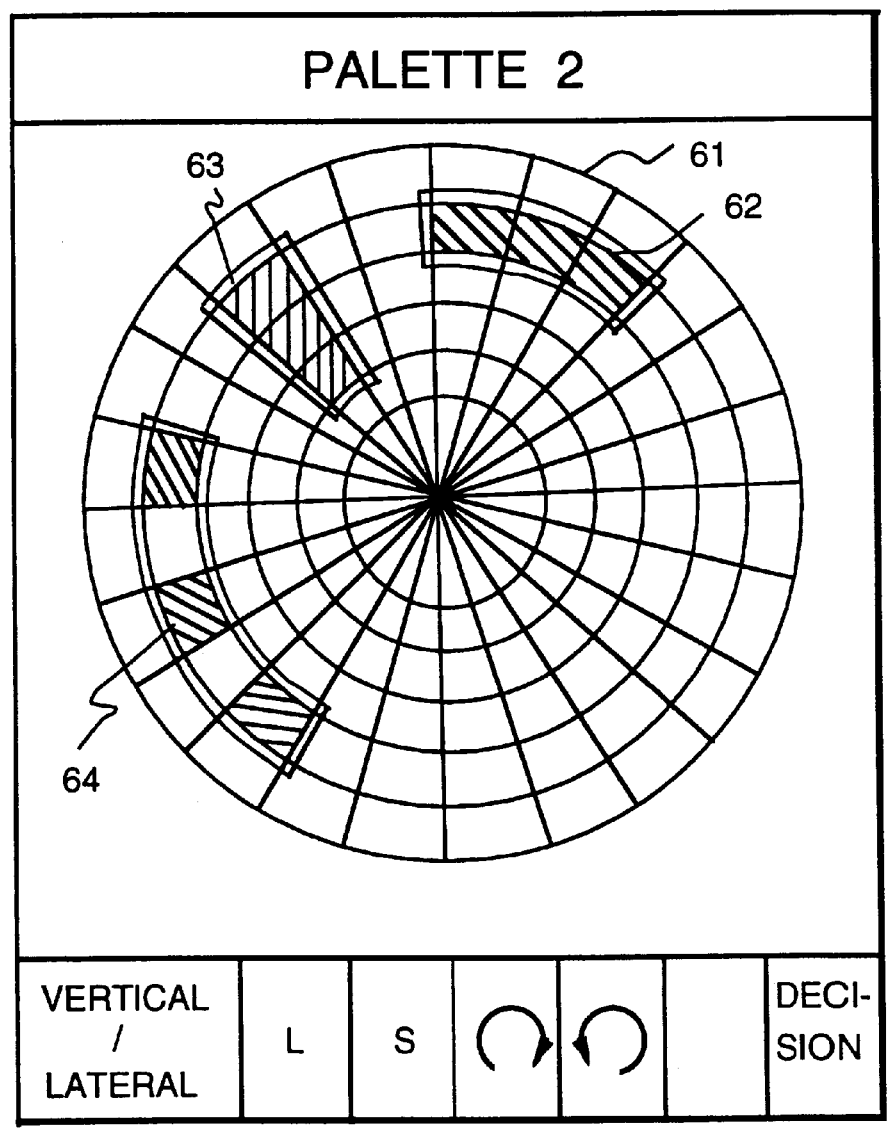
FIG. 6 is a diagram showing a circular color chart and the color designation cursors according to an embodiment of the invention.

A palette of a circular chart type shown by reference numeral 61 in FIG. 6 can be also obtained by arranging the hues in the circumferential direction and the lightness in the radial direction.

Figure 3:
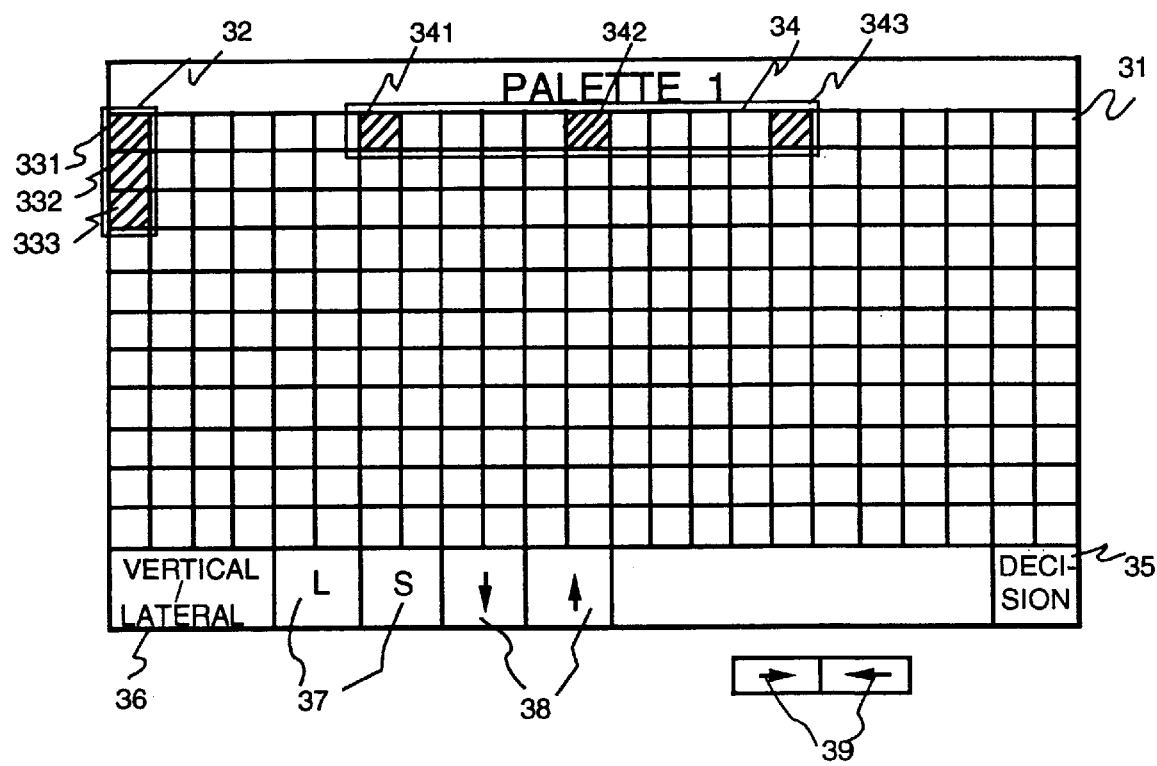
FIG. 3 is a diagram showing color samples and color designation cursors according to an embodiment of the invention.

It is preferable to use selecting means such as a cursor 32 in FIG. 3 as a method of selecting the color samples used in FIG. 3.

The cursor 32 can freely move in the palette on a color sample unit basis and has a shape by which the color samples of the number corresponding to the number of ID numbers can be selected. The cursor 32 is used in a case where the number of ID numbers is equal to three. By instructing color sample deciding means 35 by a mouse, the three color samples 331, 332, and 333 indicated by the cursor 32 at the moment can be designated in a lump.

By using the cursor of such a shape, a plurality of colors can be designated in a lump.

In case of the check patterned palette as shown in FIG. 3, it is necessary to use a rectangular cursor like the cursor 32. In case of a circular chart 61 as shown in FIG. 6, a similar result can be obtained by using cursors of which shapes fit to the shapes of the palette like cursors 62, 63, and 64.

Figure 5:
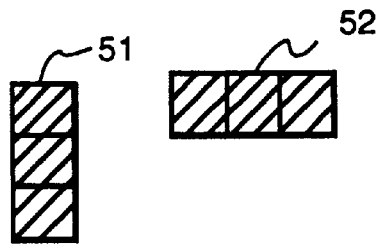
FIG. 5 is a diagram showing a vertical cursor and a lateral cursor according to an embodiment of the invention.

In FIG. 3, there is provided means for changing the direction of the color samples to be obtained, like from a vertically-long cursor 51 to a laterally-long cursor 52 as shown in FIG. 5, by instructing cursor direction changing means 36 by a mouse or the like.

When the vertically-long cursor 51 shown in FIG. 5 is used in the palette 31 of FIG. 3, three color samples having subtle variations in lightness in the same hue can be selected. When the laterally-long cursor 52 is used, three color samples having subtle variations in hue in the same lightness can be obtained.

Figure 4:
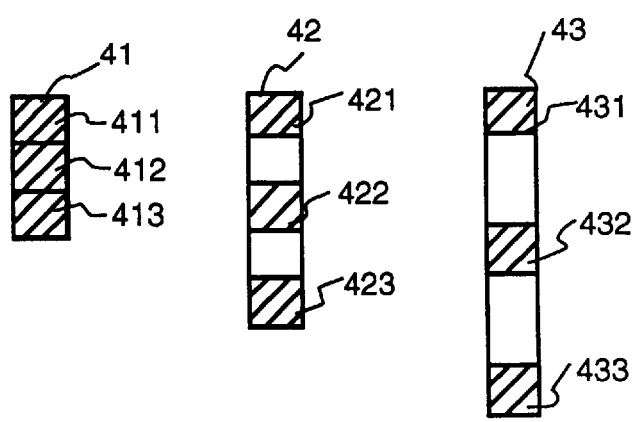
FIG. 4 is a diagram showing a result of changes in shape of the color designation cursor according to an embodiment of the invention.

Further, the length of the cursor 51 is changed as shown in FIG. 4 by length changing means 38 (length changing means 39 in case of the laterally-long cursor 52) in FIG. 3.

When the number of ID numbers is equal to three, the cursor has a shape like a cursor 41 in an initial set. The cursor 41 sequentially designates three color of color samples 411, 412, and 413 in accordance with the order from the upper to the lower or from the lower to the upper. By using the cursor 41 in the palette 31 of FIG. 3, three color samples having subtle variations in hue or lightness can be selected.

When cursor length changing means 37 in FIG. 3 is instructed by the mouse or the like, the length of the cursor can be changed as shown by cursors 42 and 43. The cursor 42 in the cursor position at that moment can designate three color samples existing in positions indicated by reference numerals 421, 422, and 423. Similarly, the cursor 43 can designate color samples indicated by reference numerals 431, 432, and 433.

When the cursors 42 and 43 are used in the palette 31 of FIG. 3, three color samples having hue or lightness variations which are more dynamic than those in case of the cursor 41 can be designated.

The laterally-long cursor of which length is elongated to the maximum is effective when the number of areas to be distinguished is large. This is because it is easier to distinguish the areas having dynamic hue variations when the number of areas to be distinguished is large. It is sufficient to perform the selecting operation once by using such a cursor, so that conventional operations to designate colors by the number of areas can be omitted.

Further, an ordering operation is performed to the plurality of color samples selected by the cursor.

The ordering operation to the color samples 331, 332, and 333 is performed by the cursor 32 in FIG. 3 in accordance with the order from the upper sample to the lower in an initial state. By operating the order designating area 38 displayed on the display screen by the mouse, the direction of ordering can be changed to the direction from the lower to the upper, that is, to the order of the color samples 333, 332, and 331.

The ordering operation intends to make correspond the color and the area in a one-to-one manner. When it is sufficient to paint the selected plurality of colors in the plurality of areas at random, it is unnecessary to give the ID numbers to the areas nor to make the color samples ordered.

On the other hand, when the color and the area are made correspond in the one-to-one manner and the color sample on the palette is selected while controlling which color sample is arranged to which area, it is necessary to give the ID numbers to the areas and to make the color samples ordered.

A procedure for arranging colors to the graph of FIG. 1 by using the palette 31 and the cursor 32 in FIG. 3 will now be described.

As a stage before the procedure, it is now assumed that segments constructing the graph are displayed on the display, ID number 1 is given to the areas 111, 112, and 113 by the ID number providing means, ID number 2 is given to the areas 121, 122, and 123, and ID number 3 is given to the areas 131, 132, and 133.

The user allows the palette to be displayed on the screen at the stage of coloring when a cursor of a size which can designate the color samples of the number corresponding to the number of ID numbers, namely, three color samples exists as shown by reference numeral 32 in FIG. 3 on the palette in the initial set.

Since the three color samples selected by the cursor have the same hue and subtle variations in lightness, however, they are not preferable for an object to clearly distinguish the areas of the bar graph. In order to achieve the object, it is effective to select the three color samples having dynamic variations in hue and the maximum lightness.

The user changes the direction of the cursor to lateral by instructing "lateral" in the cursor direction changing display area 36 by the mouse and elongates the cursor by instructing "long" in the cursor length change display area 37, moves the position of the cursor by cursor keys on the keyboard or the like, thereby bringing the cursor to the position indicated by reference numeral 34. Three color samples 341, 342, and 343 are instructed by the cursor 34.

According to the example, "long" is clicked four times and three colors are designated in a lump by the cursor having four intervals. When "short" is clicked, the cursor is shortened by the number of clicks.

When the user is satisfied with the three color samples, the order of the three color samples is decided by instructing one of the directions of order designating means 39 at last. When it is assumed that the user selects the arrow in the right direction, the order of the color samples 341, 342, and 343 is decided.

The color samples and the order of the color samples to the three areas are instructed as mentioned above.

When the user instructs the color sample deciding means 35, the control means paints the color sample 341 that is the first in the order to the areas 111, 112, and 113 of ID number 1, the next color sample 342 to the areas 121, 122, and 123 of ID number 2, and the last color sample 343 to the areas 131, 132, and 133 of ID number 3, thereby finishing the color arranging process.

Although the cursor is described as a "rectangle cursor", it can be substituted by a "straight line" (underline). Further, parentheses indicative of a start point and an end point of color can be similarly used. That is, anything which can indicate desired start and end points of a desired color can be used.

The cursor can also have a shape of "lozenge", "pentagonal", "hexagonal" or a shape optionally formed by the user.

Although the example of FIG. 1 shows the bar graph, it will be easily understood that the invention can be also applied to a circular graph and a line graph.

Although the palette for expressing the gradation using all of the elements of RGB has been used in the embodiment, the operation of the embodiment can be also applied to a palette for expressing others, for instance, a pastel color palette in which light colors are collected, a warm color palette in which red is relatively mainly expressed, a cold color palette in which blue is mainly expressed, a monochrome palette in which colors are gradually expressed from black to gray and gray to white, and the like.

Although the palette is colored in a check pattern, one color sample which has no check pattern and in which hue and lightness are sequentially changed can be also used.

According to the invention, the color arranging operation to a plurality of areas can be easily performed and the numbers of conventional operation steps of designating colors to every area can be reduced. Particularly, when the number of areas is large or when the color is arranged with regularity to the areas, a simple color designating operation environment can be provided.

What is claimed is:

1. A painting method for painting a graphic displayed on a screen, comprising the steps of:

assigning a plurality of identifiers identifying each of a plurality of regions wherein each region is surrounded by a segment of said graphic to be painted;

displaying a color sample on said screen;

selecting a plurality of colors from said color sample corresponding to the number of said plurality of identifiers in a lump;

sequencing said plurality of colors having been selected; and painting said plurality of regions corresponding to said plurality of identifiers with said plurality of colors assigned thereto according to said sequencing.

2. A method according to claim 1, wherein the identifiers are numbers.

* * * * *